United States Patent
Harris et al.

[11] Patent Number: 6,139,453
[45] Date of Patent: Oct. 31, 2000

[54] BELT SPROCKET HAVING A SPACER MEMBER

[75] Inventors: Gene Harris, Lubbock; Mark C. Talley, Grapevine, both of Tex.

[73] Assignee: Innovative Motorcycle Products, Inc., Grapevine, Tex.

[21] Appl. No.: 08/807,245

[22] Filed: Feb. 28, 1997

[51] Int. Cl.[7] .......................... F16H 55/30; F16H 55/49; F16H 7/18

[52] U.S. Cl. .......................... 474/100; 474/160; 474/170

[58] Field of Search ...................................... 474/100, 163, 474/162, 152, 153, 160, 164, 161, 165, 273, 157, 158, 159, 85, 84, 86, 141, 150, 151, 144; 74/89.21, 434, 413; 29/235; 198/834, 835

[56] References Cited

U.S. PATENT DOCUMENTS

| | | | |
|---|---|---|---|
| 3,745,312 | 7/1973 | Ladine et al. | 235/61.11 R |
| 4,122,903 | 10/1978 | Cole | 74/413 |
| 4,261,214 | 4/1981 | Watanabe et al. | 474/161 X |
| 4,760,752 | 8/1988 | Wield et al. | 74/434 |
| 5,133,694 | 7/1992 | Coste | 474/152 |
| 5,224,903 | 7/1993 | Langhof et al. | 474/152 |
| 5,415,592 | 5/1995 | Hoyt | 474/160 X |

FOREIGN PATENT DOCUMENTS 1961190  1/1997  Germany.

*Primary Examiner*—David A. Bucci
*Assistant Examiner*—Marcus Charles
*Attorney, Agent, or Firm*—Gardere & Wynne, L.L.P.; Lawrence R. Youst; Kenneth T. Emauelson

[57] ABSTRACT

The present invention disclosed herein comprises a sprocket having circumferentially spaced teeth that are axially aligned and engageable with a positive drive belt, the sprocket having first and second guide flanges extending radially outward on opposite sides of the sprocket and a spacer member disposed adjacent to the first guide flange, encircling the sprocket and engaging the teeth of the sprocket such that the positive drive belt is disposed between the spacer member and the second guide flange, thereby reducing the required width of the positive drive belt.

12 Claims, 2 Drawing Sheets

BELT SPROCKET HAVING A SPACER MEMBER

TECHNICAL FIELD OF THE INVENTION

This invention relates, in general, to a belt driven sprocket and, in particular to, a sprocket having a spacer member disposed between a first and a second guide flange of the sprocket such that the required width of the drive belt may be reduced.

BACKGROUND OF THE INVENTION

Without limiting the scope of the invention, its background is described in connection with belt driven motorcycle sprockets, as an example.

Heretofore, in this field, belt driven sprockets have been used to drive the rear wheel of a motorcycle. Typically, these sprockets have a plurality of circumferentially spaced teeth that are axially aligned and may receive a positive drive belt therein such that the teeth of the positive drive belt move into and out of engagement with the teeth of the sprocket to transfer a driving force to the sprocket. The positive drive belt has teeth that are generally round in cross section and are able to mesh with a sprocket having conjugate mating teeth.

The sprocket distributes a driving load to the belt along the entire driving surface of the belt teeth to effect a stress distribution. Thus, these round belt teeth are suitable to receive high sprocket loading in high torque drives. Also, the round belt teeth have sufficient depth to exhibit anti-ratcheting qualities at high tension ratios such as that which may be encountered in a fixed two-point drive which may become loosened through belt tension decay.

It has been found, however, that when a conventional sprocket is used on a motorcycle, the size of the rear tire is limited by the interference between the rear tire and the drive belt. In fact, the use of a super-wide rear tire is one of the most desirable looks on a motorcycle and, in particular, on a custom Harley. In addition, it has been found that the use of a super-wide rear tire provides a softer ride, better feel for the road, and more stability.

In order to install a super-wide tire on a motorcycle, many people have offset their motor, transmission and rear wheel. Other people have changed the frames and/or swingarms of a motorcycle in order to accommodate such a super-wide rear tire. All of these modifications, however, result in two undesirable and detrimental outcomes. Specifically, these modifications can be extremely expensive and these modifications usually result in a motorcycle that pulls to one side when it is driven in a straight line. In addition to these problems, modifications to original equipment may result in a warranty on the motorcycle becoming void.

More recently, an aftermarket kit has been marketed which may be coupled with an existing motorcycle sprocket to allow for the use of a super-wide rear tire without the necessity of offsetting the motor or the transmission and without changing frames or swingarms. This kit, however, is expensive and it requires the use of shims to offset the sprocket relative to the rear tire.

Therefore, a need has arisen for a belt driven sprocket for use in driving the rear wheel of a motorcycle that allows for the use of a super-wide tire without requiring the offset of the motor, the transmission, or the existing sprocket and without requiring the need to change frames or swingarms.

SUMMARY OF THE INVENTION

The present invention disclosed herein comprises a sprocket having circumferentially spaced teeth that are axially aligned and are engageable with a positive drive belt having teeth which move into and out of the teeth of the sprocket to transfer a driving force to the sprocket, that may be used in conjunction with a super-wide rear tire, that does not require the offset of the motor, the transmission or the sprocket and that does not require changing frames or swingarms.

The sprocket of the present invention comprises first and second guide flanges which extend radially outward on opposite sides of the sprocket such that the teeth of the sprocket are disposed therebetween and such that the guide flanges retain the positive drive belt in radial alignment with the teeth of the sprocket. The sprocket of the present invention further comprises a spacer member that is disposed adjacent to the first guide flange which extends axially toward the second guide flange. The spacer member engages the teeth of the sprocket around the entire outer circumference of the sprocket such that the positive drive belt is disposed between the spacer member and the second guide flange during operation. The use of the sprocket of the present invention having the spacer member reduces the required width of the positive drive belt, thereby preventing interference between the positive drive belt and a super-wide rear tire.

In one embodiment of the present invention, an adhesive layer is disposed between the first guide flange, the teeth of the sprocket and the spacer member to secure the spacer member to the sprocket. The spacer member may be constructed out of a variety of materials including, but not limited to, a polyurethane, including a molded castable polyurethane, aluminum, rubber, or plastic.

In another embodiment of the present invention, the distance between the first guide flange and the second guide flange is about one and one-half inches. The spacer member which is adjacent to the first guide flange may have a width between about seven-sixteenths of an inch and one-half inch. The corresponding drive belt would have a width of about one inch.

BRIEF DESCRIPTION OF THE DRAWINGS

For a more complete understanding of the present invention, reference is now made to the detailed description of the invention along with the following drawings in which like numerals represent like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
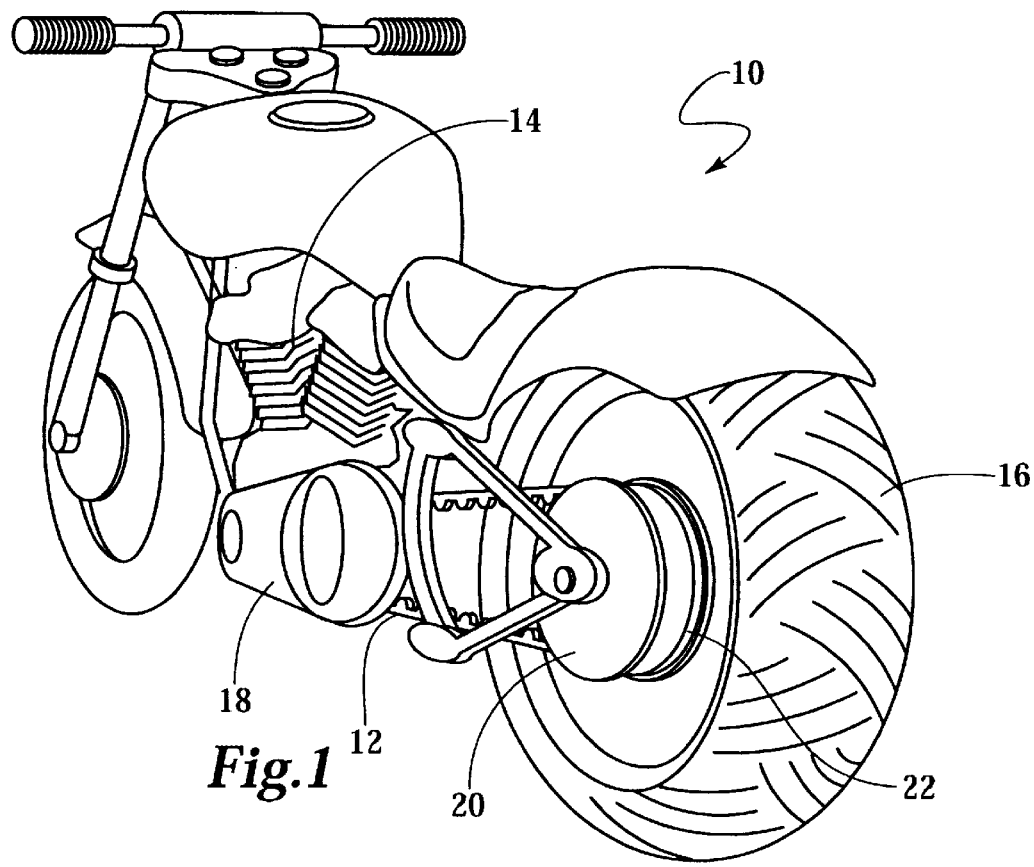
FIG. 1 is a perspective representation of a motorcycle having a super-wide rear tire and having a belt driven sprocket of the present invention.

In FIG. 1, a perspective representation of a motorcycle having a super-wide wheel and having a belt driven sprocket of the present invention is depicted and generally designated 10. Motorcycle 10 may be any typical motorcycle which uses a positive drive belt 12 to transfer drive force from the engine 14 to the rear wheel 16. Drive belt 12 is coupled to drive pulley 18 and sprocket 20. Sprocket 20 includes spacer member 22 which engages the teeth of sprocket 20 around the entire outer circumference of sprocket 20 such that the width of positive drive belt 12 may be reduced. By incorporating 20 spacer member 22 into sprocket 20 and orienting sprocket 20 such that spacer member 22 is disposed toward the inside of motorcycle 10, the clearance between rear wheel 16 and positive drive belt 12 can be increased, thereby allowing the use of a wider rear tire to enhance the appearance of motorcycle 10 and to improve the ride, feel for the road and stability of motorcycle 10 during operation.

Even though FIG. 1 depicts sprocket 20 having spacer member 22 attached to the rear wheel of motorcycle 10, it should be understood by one skilled in the art that sprocket 20 of the present invention is equally well-suited for a variety of services any time it is necessary to incorporate a narrow positive drive belt 12 into a sprocket 20.

Figure 2:
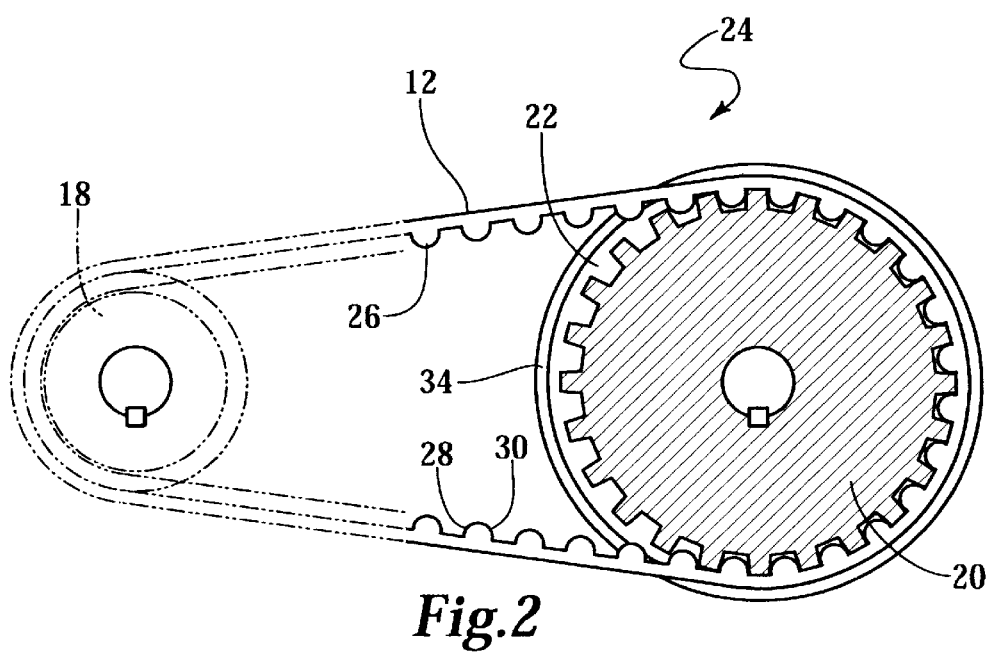
FIG. 2 is a side elevation partially cut-away of a drive system including a belt driven sprocket of the present invention.

FIG. 2 is a partial cut-away of a typical drive system incorporating the sprocket of the present invention and is generally designated 24. Drive system 24 includes sprocket 20 and drive pulley 18 which are operably coupled together by positive drive belt 12. Positive drive belt 12 has a plurality of teeth 26 which have oppositely facing curvilinear drive surfaces 28 and 30. Sprocket 20 has a plurality of axially aligned symmetrical teeth 32 for meshing with teeth 26 of positive drive belt 12. In operation, teeth 26 of positive drive belt 12 move into and out of teeth 32 of sprocket 20 to transfer driving force from drive pulley 18 to sprocket 20. Sprocket 20 also includes guide flange 34, guide flange 36 and spacer member 22 which control the axially movement of positive drive belt 12 within sprocket 20.

Figure 3:
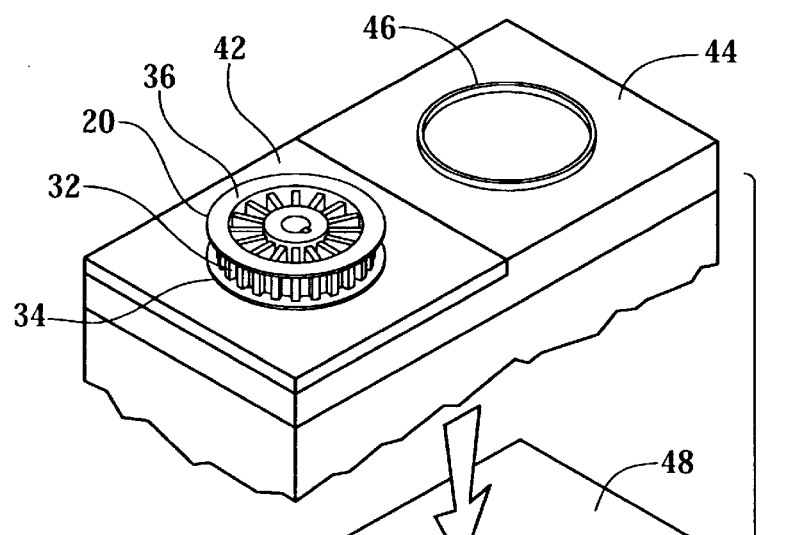
FIG. 3 is a top view of a belt driven sprocket of the present invention.

As best seen in FIG. 3, sprocket 20 includes a pair of guide flanges 34, 36 which define the outer axially surfaces of sprocket 20 and which extend radially outward beyond teeth 32 of sprocket 20. Spacer member 22 is disposed adjacent to guide flange 34 and extends an axially distance toward guide flange 36. Spacer member 22 engages teeth 32 of sprocket 20 around the entire outer circumference of sprocket 20. In operation, positive drive belt 12 is disposed between spacer member 22 and guide flange 36 such that guide flange 36 and spacer member 22 retain positive drive belt 12 in radial alignment with teeth 32 of sprocket 20. The use of spacer member 22 reduces the required width of positive drive belt 12, thereby providing additional clearance between positive drive belt 12 and guide flange 34.

In one embodiment of the present invention, the distance between guide flange 34 and guide flange 36 is approximately one and one-half inches. This typical width allows the use of a positive drive belt which has a nominal width of one and one-half inches. Incorporating spacer member 22 of the present invention into sprocket 20, however, reduces the available width between guide flange 34 and guide flange 36. For example, spacer member 22 may have a width between about seven-sixteenths of an inch and one-half inch. In this embodiment, a positive drive belt 12 having a nominal width of one inch would be preferred. Using a nominal one inch positive drive belt 12 would provide an additional one-half inch clearance between positive drive belt 12 and guide flange 34 which would, in turn, add an additional one-half inch clearance between positive drive belt 12 and other nearby objects such as rear tire 16 of motorcycle 10, thereby preventing interference between positive drive belt 12 and rear tire 16.

It should be noted by one skilled in the art, that the exact dimensions of sprocket 20, spacer member 22 and positive drive belt 12 will vary based upon the intended service of sprocket 20 as well as the necessary clearance between positive drive belt 12 and nearby objects.

Figure 4:
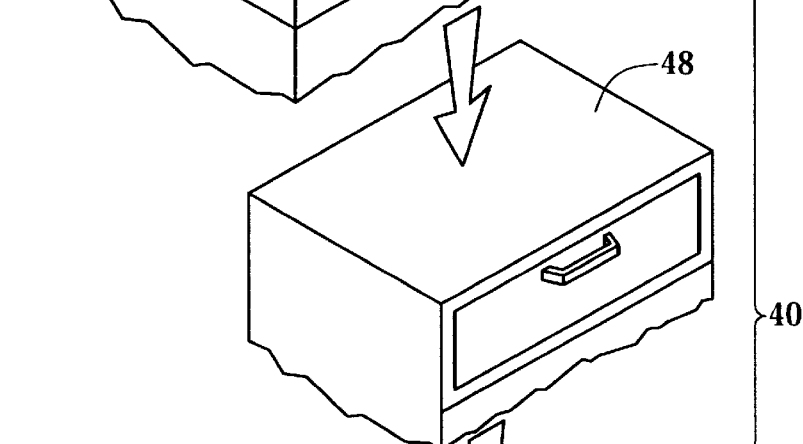
FIG. 4 is a schematic representation of the process for manufacturing a belt driven sprocket of the present invention.
Figure 4:
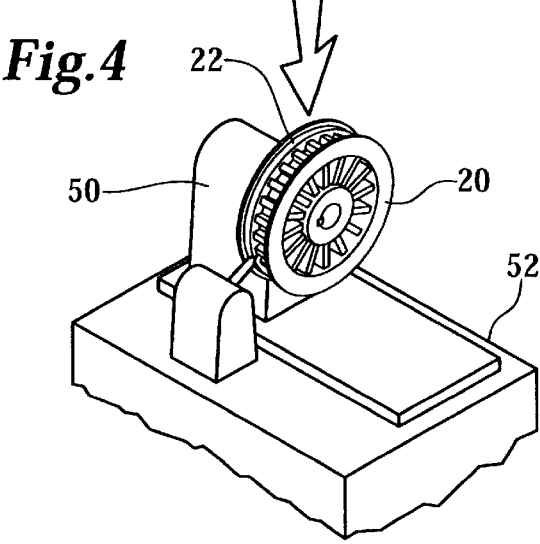

In FIG. 4, a schematic representation of the process for manufacturing sprocket 20 of the present invention is depicted and generally designated 40. Process 40 involves placing sprocket 20 on a heated work surface 42 of table 44. A mold ring 46 is placed around sprocket 20 such that mold ring 46 is closely received by guide flange 34. Once mold ring 46 is in place around sprocket 20, a liquid resin is poured into mold ring 46 such that the liquid resin engages the upper surface of guide flange 34 and teeth 32 of sprocket 20. The liquid resin is allowed to set up around the entire circumference of sprocket 20 such that the liquid resin extends an axial distance up toward guide flange 36. In one embodiment, heated work surface 42 has a temperature between about 200 and 250 degrees Fahrenheit. This temperature allows the liquid resin to sufficiently set up and solidify on sprocket 20.

Once the liquid resin has set up on sprocket 20, sprocket 20 may be placed in oven 48 to cure the liquid resin. In one embodiment, oven 48 is heated to a temperature of between about 350 and 400 degrees Fahrenheit. The liquid resin may be allowed to cure in oven 48 for a period between about two and three hours. Once the liquid resin has cured, sprocket 20 is removed from oven 48 and allowed to cool. Thereafter, sprocket 20 is placed on lathe 50 at work station 52 in order to turn sprocket 20 to remove excess portions of the solidified liquid resin and to balance sprocket 20.

In one embodiment of the present invention, an adhesive is applied to guide flange 34 and teeth 32 of sprocket 20 prior to pouring the liquid resin into mold ring 46.

The above described process 40 is intended for a polyurethane liquid resin. Such a polyurethane liquid resin would have sufficient durability to perform the function of spacer member 22 in operation on motorcycle 10. A suitable polyurethane would have elastomeric properties as follows:

| ELASTOMER PROPERTIES P-464 | | |
|---|---|---|
| | | ASTM TEST PROCEDURE |
| Hardness (A) | 85 | D2240 |
| 100% Elongation (PSI) | 650 | D412-62T |
| 300% Elongation (PSI) | 1600 | D412-62T |
| Tensile Strength (PSI) | 7500 | D412-62T |
| Elongation (%) | 550 | D412-62T |
| Die C (PLI) | 450 | D624-73 |
| Split (PLI) | 235 | D470 |
| Rebound (%) | 15 | D412-62T |
| Compression Set (%) | 35 | D-395-61(B) |

It should be noted by one skilled in the art that a variety of structural materials would be interchangeable with polyurethane, including, but not limited to, rubber and plastic. In an alternate embodiment, a metal spacer member, such as an aluminum spacer member, may be used in place of the polyurethane spacer member 22. In the case of an aluminum spacer, sections of the aluminum spacer could be cast or machined to be closely received within sprocket 20 and bolted in place with countersunk fasteners.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

Please amend claim 2 as follows:

1. A sprocket having circumferentially spaced teeth that are axially aligned and engaged by a positive drive belt having teeth which move into and out of engagement with the teeth of the sprocket to transfer driving force thereto, the sprocket comprising:

first and second guide flanges extending radially outward on opposite sides of the sprocket such that the teeth of the sprocket are disposed therebetween and such that said guide flanges retain the positive drive belt in radial alignment with the teeth of the sprocket;

a spacer member disposed adjacent to said first guide flange and extending axially a distance toward said second guide flange, said spacer member encircling the sprocket and engaging the teeth of the sprocket such that the positive drive belt is disposed between said spacer member and said second guide flange, thereby reducing the required width of the positive drive belt; and an adhesive layer disposed between said first guide flange, the teeth of the sprocket and said spacer member.

2. The sprocket as recited in claim 1 wherein the axial distance between said first guide flange and said second guide flange is about one and one-half inches, wherein said spacer member extends an axial distance from said first guide flange toward said second guide flange of between about seven-sixteenths of an inch and one-half inch and wherein the positive drive belt has a width of about one inch.

3. The sprocket as recited in claim 1 wherein said spacer member further comprises polyurethane.

4. The sprocket as recited in claim 3 wherein said polyurethane is a molded castable polyurethane.

5. The sprocket as recited in claim 1 wherein said spacer member further comprises aluminum.

6. The sprocket as recited in claim 1 wherein said spacer member further comprises rubber.

7. The sprocket as recited in claim 1 wherein said spacer member further comprises plastic.

8. A belt driven sprocket for use in driving the rear wheel of a motorcycle wherein the sprocket has circumferentially spaced teeth that are axially aligned and wherein the sprocket is engaged by a positive drive belt having teeth which move into and out of the teeth of the sprocket to transfer driving force thereto, the sprocket comprising:

a pair of guide flanges disposed peripherally on opposite sides of the sprocket such that the teeth of the sprocket are disposed therebetween and such that said guide flanges retain the positive drive belt in radial alignment with the teeth of the sprocket;

a spacer member disposed adjacent to one of said guide flanges and extending an axial distance toward the other of said guide flanges, said spacer member engaging the teeth of the sprocket around the entire outer circumference of the sprocket such that the positive drive belt is disposed between said spacer member and the other of said guide flanges, thereby reducing the required width of the positive drive belt; and an adhesive layer disposed between one of said guide flanges, the teeth of the sprocket and said spacer member.

9. The sprocket as recited in claim 8 wherein the axial distance between said pair of guide flanges is about one and one-half inches, wherein the axial distance said spacer member extends from one of said guide flanges toward the other of said guide flanges is between about seven-sixteenths of an inch and one-half inch and wherein the positive drive belt has a width of about one inch.

10. The sprocket as recited in claim 8 wherein said spacer member further comprises polyurethane.

11. The sprocket as recited in claim 8 wherein said spacer member further comprises aluminum.

12. The sprocket as recited in claim 8 wherein said spacer member further comprises rubber.

* * * * *